US011424611B2

(12) United States Patent
Groeger et al.

(10) Patent No.: US 11,424,611 B2
(45) Date of Patent: Aug. 23, 2022

(54) NETWORK SERVICE AND TRANSFORMER SAFETY PROTECTOR

(71) Applicants: Carte International Inc., Winnipeg (CA); Quality Switch, Inc., Newton Falls, OH (US)

(72) Inventors: Joseph H. Groeger, Storrs, CT (US); Garth Norberg, Winnipeg (CA); Jeremy Sewell, Southington, OH (US); Larry Dix, Cortland, OH (US); Dan Schwartz, Cortland, OH (US); Brian Klaponski, Winnipeg (CA)

(73) Assignees: Carte International Inc., Winnipeg (CA); Quality Switch, Inc., Newton Falls, OH (US)

( * ) Notice: Subject to any disclaimer, the term of this patent is extended or adjusted under 35 U.S.C. 154(b) by 230 days.

(21) Appl. No.: 16/841,003

(22) Filed: Apr. 6, 2020

(65) Prior Publication Data

US 2020/0321772 A1    Oct. 8, 2020

Related U.S. Application Data

(60) Provisional application No. 62/829,413, filed on Apr. 4, 2019.

(51) Int. Cl.
*H02H 7/04* (2006.01)
*H02H 1/00* (2006.01)
*H01F 27/40* (2006.01)

(52) U.S. Cl.
CPC ............. *H02H 7/04* (2013.01); *H01F 27/402* (2013.01); *H02H 1/0007* (2013.01)

(58) Field of Classification Search
CPC ........ H02H 1/0007; H02H 3/003; H02H 7/04; H01H 1/0203; H01H 1/0206; H01H 33/022; H01H 33/66261; H01H 33/6662; H01H 2033/66269; H01H 2033/66292; H01F 27/402
USPC .............................................................. 361/35
See application file for complete search history.

(56) References Cited

U.S. PATENT DOCUMENTS

| | | | |
|---|---|---|---|
| 3,947,728 A | 3/1976 | Smith | |
| 5,597,992 A | 1/1997 | Walker | |
| 5,822,165 A | 10/1998 | Moran | |
| 5,844,781 A | 12/1998 | Schlotterer et al. | |
| 6,359,765 B1 | 3/2002 | Bier | |
| 6,362,445 B1 * | 3/2002 | Marchand | H02B 13/0354 218/155 |
| 6,504,693 B1 * | 1/2003 | Moffat | H02H 3/286 361/76 |
| 6,671,151 B2 | 12/2003 | Smith et al. | |

(Continued)

FOREIGN PATENT DOCUMENTS

CN            101127281 A   *   2/2008

*Primary Examiner* — Kevin J Comber
(74) *Attorney, Agent, or Firm* — Carmody Torrance Sandak & Hennessey LLP.

(57) ABSTRACT

A network service and transformer safety protector on a secondary side of a network transformer tank system. The network service and transformer safety protector is positioned between the network transformer and a secondary network distribution system and is configured to connect and disconnect a transformer from the secondary network. The network service and transformer safety protector is attached to the outside of the transformer tank.

12 Claims, 12 Drawing Sheets

(56) References Cited

U.S. PATENT DOCUMENTS

| | | | |
|---|---|---|---|
| 6,810,069 B2 * | 10/2004 | Kojovic | H02H 3/28 |
| | | | 373/104 |
| 8,068,320 B2 * | 11/2011 | Faulkner | H02B 7/06 |
| | | | 361/620 |
| 9,136,077 B2 | 9/2015 | Hu et al. | |
| 10,217,556 B2 | 2/2019 | Groeger et al. | |
| 2008/0067152 A1 * | 3/2008 | Kikukawa | H01H 33/66 |
| | | | 218/139 |
| 2012/0274440 A1 | 11/2012 | Meadows et al. | |
| 2018/0301279 A1 | 10/2018 | Klaponski et al. | |

\* cited by examiner

NETWORK SERVICE AND TRANSFORMER SAFETY PROTECTOR

CROSS-REFERENCE TO RELATED APPLICATIONS

The present application claims the benefit of U.S. Provisional Application No. 62/829,413, the subject matter of which is herein incorporated by reference in its entirety.

FIELD OF THE INVENTION

The present invention relates generally to a network transformer unit that includes a network protector positioned on the secondary side of a network transformer for connecting/disconnecting the transformer to/from a secondary network power distribution system in response to predetermined electrical conditions on the primary feeder, network transformer, and the network.

BACKGROUND OF THE INVENTION

Medium voltage electrical power systems operated by electrical utility firms and the like typically include a large number of transformers, switches, circuit breakers, capacitor banks, and other major pieces of electrical equipment often interconnected through heavy duty cabling and switching devices for connecting and disconnecting the equipment to the network. Protective devices, including, but not limited to, fuses, circuit breakers, limiters, arrestors, and protective relay devices can be connected to the major pieces of equipment and are designed to open and close circuitry in the power system when fault conditions occur to protect the system from damage, protect public safety, and limit the impact of outages.

Electrical power is transmitted from substations through cables, which interconnect to other cables and electrical apparatus in a power distribution network. Electrical components such as power distribution transformers are interconnected in the network via medium voltage and low voltage cables, and a variety of switchgear is used to connect and disconnect power connections to the components and associated circuitry. Power switches have been used for many years to connect and disconnect power sources to loads.

Transformers are used extensively in the transmission and distribution of electrical power, at both the generating end and the consumer's end of the power distribution system, as well as at intermediate points, including substations, for example. Transformers include, for example, distribution transformers that convert medium-voltage electricity to lower voltage levels acceptable for direct use by commercial and residential customers. Also included are network transformers that supply power to grid-type or radial secondary distribution systems in areas of high load density. Transformers in these applications are often installed within underground vaults, vaults in parking garages, or commercial building basement vaults, for example. These areas of high load density include, for example, government, commercial, institutional and industrial facilities, office towers, apartment buildings, shopping centers, and retail businesses.

Low-voltage electrical power networks consist of interlaced loops or grid systems. These systems are supplied with electrical energy by two or more power sources, in order that the loss of any one power source does not result in an interruption of power. Such low voltage secondary network systems provide the highest level of reliability possible with conventional power distribution and are normally used to serve high-density load areas. Primary applications include, for example, central or downtown city areas, large buildings, shopping centers, and some industrial plants. These network systems can be of the grid type or spot type with three-phase three-wire or three-phase four-wire service at, for example, 208Y/120V or 480Y/277V.

Network transformers receive power at a higher distribution voltage and provide electric power at a lower voltage to a secondary network and can include multiple switching devices. One switching device is located on the primary side (incoming power feed). This is typically a medium voltage, between 4,000 volts (4 kV) and 35,000 volts (35 kV), configured in wye or delta arrangement. Another switching device is on the load (customer) side and is most often three-phase 120/208 volts or 277/480 volts. The switch on the secondary side is identified as a network protector. This can be considered a 'smart' switch that includes network condition assessment (i.e., load support required, network dead, network with low impedance ground path, etc.) plus at least partial sensing that there is or is not a primary voltage source available to the transformer. This network protector also includes fuses for a secondary level of protection for the transformer.

Transformers are generally configured to include a core and insulated electrical conductors that are wound around the core so as to form at least two windings (or coils). These windings or coils are installed concentrically around a common core of magnetically suitable material such as iron and iron alloys and are electrically insulated from each other. The primary winding or coil receives energy from an alternating current (AC) source. The secondary winding receives energy by mutual inductance from the primary winding and delivers that energy to a load that is connected to the secondary winding. The core provides a circuit for the magnetic flux created by the alternating current flowing in the primary winding and includes the current flow in the secondary winding. The core and windings are typically retained within an enclosure or tank for safety and to protect the core and coil assembly from damage. The tank also provides a clean environment, free of moisture. The tank is typically filled with an insulating fluid that provides electrical insulation value, while also serving to conduct heat away from the core and coil assembly to the tank surface and external cooling panels, where fitted. Connections between the feeder cables, through the primary switch (where fitted), and transformer core are made through under-oil bushings.

Power is fed to the transformer at a medium voltage level, through a plurality of medium voltage cables. This is referred to as the 'primary' power and the cables are often referred to as 'feeder' cables. Converted low voltage power then exits the transformer through a plurality of low voltage cables, which are connected to a network protector, comprising the switch on the low voltage side of the transformer.

Network transformers must be designed for challenging service and duty requirements. A network transformer typically serves loads that vary from near zero to a maximum rated sustained load, and must also be designed to withstand short circuit conditions beyond that without damage to its windings. These network transformers also often operate in confined, wet, contaminated, and stagnant locations. U.S. Pat. No. 10,217,556 to Groeger et al., the subject matter of which is herein incorporated by reference in its entirety, describes a fault-tolerant power transformer design and method of fabrication that is capable of containing energy resulting from a sudden generation of gases which increase the pressure inside a transformer tank.

Network transformers and network protectors are separate and distinct components, which are used together as part of a network system. Traditionally the network transformer and corresponding network protector are attached or coupled directly in almost all cases, and perform as a single unit. A gasket can be disposed between the mating low voltage throat of the network transformer and the network protector, which are then bolted together to form a submersible seal.

The network protector is a specialized type of circuit breaker positioned between the secondary side of the network transformer and the secondary network. with associated control relaying and comprises a three-phase low voltage, high current switching device. Network protectors have traditionally been designed as automatic, air-insulated, air-break circuit breakers. The network protector must: (1) open the circuit for loss of power to the transformer or faults, either in the transformer or the primary feeder serving the transformer, (2) automatically open the circuit whenever power flows form the network through the transformer to the primary cable (reverse power flow), (3) close the circuit whenever conditions are such that power is required to flow from the transformer to supply the network, and (4) isolate the transformer from the network when an overload condition arises due to a cable fault or other adverse condition, for example.

Network protectors are also typically available as open-frame units that are free-standing, within submersible or non-submersible enclosures. Enclosed units may be mounted vertically on a vault wall or may be located in a room separate from the transformer vault. Other units may be mounted directly on the network transformer at its low voltage terminal, which permits connecting the low voltage buses of the protector directly to the low-side bushings of the transformer, the whole connection being enclosed within a submersible cavity. The load connections to the network are made through bushings that extend through the top of the network protector case.

Examples of network protector relays are disclosed in U.S. Pat. Nos. 3,947,728; 5,822,165; 5,844,781; 6,504,693; and 6,671,151, the subject matter of each of which is herein incorporated by reference in its entirety. Network protector relays are a key component of the network protector mechanisms that 'trips' or 'opens' a corresponding circuit breaker upon detection of power flow in the reverse direction.

The electric current path through a transformer-mounted protector extends by bus bars down the inside of the back wall, across the bottom of the base, and to disconnectable links at the bottom of the circuit breaker. At the top of the circuit breaker, current passes through the network protector fuses and to the inner connections at the bottom of the load bushings.

The main portion of the network protector is the power-operated circuit breaker, consisting of three parallel sets of mating electrical contacts that are articulated by mechanical means. Network protectors may also contain a spring-operated or 'stored energy' mechanism that enables rapid opening and rapid closing of the electrical contacts by discharging this stored energy. A motor is used to 'charge' the energy storage spring when the protector is in the 'closed' position. The stored spring energy is then released to open the network protector circuit breaker contacts rapidly to isolate a fault load, for example, and to limit the duration of the arc that develops between the contacts as they open in air. The arc that forms during contact opening under load is extinguished by a mechanical air-pressurizing system that forces the arc to extend radially into a space formed between refractory material plates typically described as 'arc chutes'. These serve to remove heat energy from the arc as well as providing surfaces that condense conductive metal vapor resulting from contact erosion. The circuit breaker is closed by spring action, through an over-center actuation mechanism, while the spring is being compressed (i.e., 'recharged') by the motor. Thus, the circuit breaker is always ready to open rapidly from the closed position.

The circuit breaker can be mounted on a carriage that may be withdrawn from the housing after removal of the disconnecting links and the fuses. The backboard of the carriage comprises, for example, a heavy fiberglass compound that may be bolted to a framework supporting the mechanism of the circuit breaker. Guide rails on either side of the case engage wheels on the side of the carriage, permitting the carriage to roll out for servicing and testing. In addition to support for the breaker mechanism, the frame also supports control relays, the wiring, and an electric motor that is capable of charging the breaker operating spring(s).

Network protectors come in three general frame sizes. Ratings for the smallest frame size range from 800 to 2,250 amperes. The next size is rated from 2,500 to 3,500 amperes and the largest is rated at 4,500 amperes. Network protectors also include a short circuit interrupting rating that varies with voltage.

Network protector fuses are placed in the circuit at the load terminals of the network protector and the main purpose of the network protector fuses is to provide back-up protection in case the network protector fails to open in the event of a fault on the primary feeder or in the network. These fuses also act to provide incidental over-current protection for secondary faults. Protector fuses can be internally- or externally-mounted. Internally-mounted fuses can be bolted to the circuit breaker and to the load bushings. Other network protectors are designed with external fuses that are mounted on top of the network protector prior to its secondary terminal connector.

An example of a conventional three-phase network transformer and network protector is described in U.S. Pat. No. 8,068,320 to Faulkner et al., the subject matter of which is herein incorporated by reference in its entirety. This network transformer includes three oil-filled chambers, a main tank having an oil level, a termination chamber or high voltage terminal compartment, a high voltage switch compartment (e.g., including a rotary, non-load breaking air switch), three-phase secondary bus work, and a mating throat for engagement with a network protector. Each of the chambers is separate and independent from the other chambers. Positive pressure can be applied in each of the chambers. The air switch can be interlocked such that the network protector is 'open', in order to remove the network transformer without de-energizing the primary feeder), and such that it can only be moved to a ground position when the network transformer is de-energized. The network protector includes, primarily, a circuit breaker and a network protector relay.

Faulkner describes a network transformer that includes a first compartment and a second compartment; a plurality of input terminals; a primary switch comprising an input and an output, the input of the primary switch being electrically connected to the input terminals; a network transformer comprising an input and an output, the output of the primary switch being electrically connected to the input of the network transformer; a network protector comprising an input, an output and a circuit breaker electrically connected between the input and the output of the network protector, the input of the network protector being electrically connected to the output of the network transformer; a plurality of circuit protection devices; and a plurality of output terminals, the circuit protection devices being electrically connected between the output of the network protector and the output terminals, wherein the circuit breaker is substantially enclosed by the second compartment, and wherein the network transformer, the primary switch and part of the network protector are enclosed by the first compartment. The enclosure may further comprise a third compartment; the network protector may further comprise a controller and a network protector relay enclosed by the third compartment; the controller may comprise a control panel enclosed by the third compartment; and the third compartment may be user accessible.

The frequency of network protector maintenance varies among utilities depending upon operating history. Maintenance cycles of 1-2 years may be optimal if the network protector is subjected to corrosive environments, a large number of operations, high energy operations, or problematic operating history. Given good operating conditions and use of submersible housings, longer maintenance cycles may be appropriate. However, after a solid primary cable fault, every protector fed from that cable must be inspected for slow operation, contact burning, or other damage. Arc chutes may require removal and replacement. Any suspected damage is cause for immediately scheduling maintenance. Most repairs require the network protector to be removed and placed into an appropriate maintenance and repair facility.

One of the failure scenarios with network protectors occurs when one fails to disengage from a network that is experiencing from an arcing fault wherein the average fault current is below the trip level for which the protector was set. In this scenario, there is a short-circuit between adjacent cables or between a cable and a grounded surface, such as a metal conduit. The average energy during the arc fault is below the 'trip' level of the network protector protective circuit, yet the transient energy can be very high and sufficient to cause and sustain a fire.

FIGS. 1 and 2 are photographs of a prior art network protector and show a catastrophically failed network protector, the result of an arcing fault that caused significant destruction inside a building due to smoke and water from a fire that started within a metal conduit in the street. The conduit was carrying the large low voltage cables that fed the building. The corresponding network transformer did not disconnect and had to be disconnected through manual intervention during the fire.

During the investigation, it was found that the arcing fault began under the street and progressed into the building. This failure mode is frequent when using prior art network protectors that may continue to feed power into a damaged circuit when there is an arcing fault. Often the gases formed by overheating cables in a conduit burn and may explode when they enter a manhole or vault where air is abundant. FIG. 3 depicts a photograph of steel conduits under the street and shows that the conduit wall was burned through by sustained, traveling cable arcing.

FIGS. 4 and 5 depict photographs of another type of network event where power feeds backward from a network and causes catastrophic damage. Six transformers fed into this network in parallel from five locations. A failure of a feeder cable that resulted in a single phase short-circuiting to ground led to a series of events that resulted major losses, including electrical isolation of an entire city block for several days. The vault fire could not be extinguished for several hours, leaving a heavy plume of sooty black smoke to be ingested into building ventilation systems, including a newly restored historic theater. The fire was so intense that it destroyed the two-transformer vault.

In this instance, the network protector failed to detect the problem. The circuit breaker at the substation that fed the transformer disconnected instantaneously when the cable short-circuited. This interrupted power flow into the transformer in the forward direction, i.e., toward the network. Because the network protector failed to respond to the short-circuited primary cable, and resulting high frequency arcing events (i.e., arcing fault), power flowed from the network back through the transformer, and into the shorted cable. This caused one of the current paths inside the transformer to overheat and burn away, resulted in a horizontal breach through the steel tank, as shown in FIG. 6. The cables feeding the transformer overheated and a fire ensued. If oil vapor escaping from the transformer through the hole had accumulated and ignited, an explosion and major event would have followed. Unfortunately, the network protectors of the prior art do not detect this type of situation, with particular respect to the individual high frequency, transient arcing events that, collectively define a 'fault event'. Thus, it can be seen that a network protector that is capable of detecting and responding to arcing fault incidents outside the trip level and frequency response of the network protector protective circuit is needed.

Network protector fuses have historically been mounted internally. FIG. 7 depicts a photograph of internally mounted 'intact' fuses. When these fuses 'open' under a short circuit condition, the metal fuse link evaporates within the network protector housing and metal vapor subsequently condenses and contaminates the interior as depicted in FIG. 8. Though some designs have included a shrouded enclosure over the internal fuses, the fuses are not fully enclosed. The protector must still be removed from service for cleaning and testing following a fuse operations event. Thus, it would be desirable to solve this problem of the prior art.

In addition, some utility companies have made a decision to utilize external fusing to prevent internal contamination of the network protector following an event where the fuses open. The reason for this is that external fuses can be tested and replaced with ease and are commercially available with a wide range of ratings and response characteristics.

However, it is typically not the network protector manufacturers who undertake the external fusing. Thus, there is often very limited clearance above a network protector that allows for installation of external fusing. In many cases, this is impossible with the present generation of fuses. It is desirable that an improved network protective device provides increased top clearance to accommodate external fuses.

One exception to this is seen in U.S. Pat. No. 6,359,765 to Bier, the subject matter of which is herein incorporated by reference in its entirety, in which a fuse link is placed under the network cable terminal at the top of the protector housing.

Network protectors have historically suffered from reliability issues. This includes modern versions with microprocessor controllers, for example, wherein they fail to open or close based on the demand. Most problematic is a failure to open during a high energy event. As a result, many utility companies conduct regular inspections and periodic testing of protectors to best ensure that they are operational. This requires crew deployments, preparation of the vaults, protection of open vaults from the public, possible security services deployment, time inside the vaults, outage scheduling, and possible repairs or adjustments. This state of affairs is highly undesirable and entirely inconsistent with the operational performance of most switching equipment on electric utility systems. Reclosers and submersible disconnect switches, by significant contrast, and for example, require no maintenance and may be tested only on the basis of need.

Some utility companies have embarked on expansion of a fiber optic-based network vault communications system that allows network protectors to be 'exercised' remotely to verify operational status. This costly effort was undertaken due to chronic unreliability of the network protectors and the potentially and often dire consequences of a protector failing to operate correctly in a contingency situation.

Maintenance is also a critical issue for the present network protectors and there are many challenges involved.

Some of the numerous in-service challenges include:
1) Through-wall corrosion and subsequent water penetration;
2) Leaks through/around gaskets;
3) Corrosion of gasketed surfaces significant enough to compromise sealing;
4) Leaks through view ports, either due to seal breach or a cracked window;
5) Leaks through operating handle shaft;
6) Fouling of the arc chutes with conductive metal vapor;
7) Erosion of the air-insulated main contacts;
8) Wear of the actuating mechanism components;
9) Need to adjust the mechanisms to offset contact erosion, with particular attention to asymmetric erosion;
10) Fouling of the internal components following a high energy event; and
11) Water leaks through connection terminal at top of housing, around the access panel (i.e., door) gasket. or leaks at mechanical or electrical penetrations into the protector network housing.

Housing hardware issues may include:
1) Corrosion of carbon steel enclosure;
2) Corrosion and subsequent door bolt seizures/fractures; and
3) Door gasket over-compression with resulting permanent deformation or cracking.

Internal corrosion concerns also exist and may include:
1) Moisture penetration not typically obvious through the viewport; and
2) Corrosion of sensitive components, often not apparent without detailed out-of-service inspections functionality testing failure.

Practical considerations include:
1) The vault environment is typically not sufficiently clean and dry for opening the protector cabinet for component inspection, testing, or repairs;
2) If the vault is flooded, the protector cannot be opened until the site is pumped out and the upper surface of the housing is dried, and which also may contain sand and debris passing through the overlying vault grates or hatches;
3) Debris on the top of network protector housing often falls into the protector when the door is opened;
4) Typically, protectors are taken back to the shop or sent to the manufacturer or service provider for inspection, testing and maintenance, while a replacement (new or reconditioned) network protector is installed;
5) No provision exists for non-invasive connection to internal components for testing and trip limit setting adjustments (i.e., cabinet door must be opened).

Fundamental complaints regarding maintenance issues include:

1) The complex mechanisms require specialized training for maintenance and troubleshooting, and repair;
2) Most repairs and maintenance require a return to the vendor, which is expensive and forces spares to remain available;
3) Too much maintenance is required, including:
   a. Arc chutes require inspection, cleaning, replacement;
   b. Electrical contacts require inspection for alignment and cleaning and resurfacing so that they are free of any pits, erosion, or surface asperities and, if necessary, replacement; and
   c. Mechanical components require lubrication;
   d. The settings and response must be frequently tested and adjusted.

Fundamental complaints regarding the design include:
1) The protector only determines if one phase of the feeders cables is energized, thus allowing single or dual phase energization of the transformer prior to closing into the network;
2) Incremental innovations, despite known risks, deficiencies, contributions to major events;
3) Operation typically requires a crewmember in the vault, and many utilities rig temporary ropes and pulleys to support switching from street level for safety;
4) Protectors can be closed into network ground faults;
5) Restoration of collapsed network requires significant crew deployment and coordination;
6) No provision for detection of transformer overload condition;
7) No provision to detect and disconnect due to arcing faults of the parallel, series, or ground type on the network side; and
8) No self-illuminated digital display feedback as to primary voltage, network protector status, or load, etc.

As a result, it can be seen that crews often operate at a disadvantage when troubleshooting or conducting network equipment inspections, resulting in incomplete or insufficient inspections which can lead to eventual arcing faults and other conditions, resulting in subsequent damage or failure to the network transformer.

Failure Modes include, for example:
1) "Hung" protector modes, including:
   a. Failure to "close" on demand in automatic mode;
   b. Failure to "open" on reverse current flow condition;
   c. Failure to operate following loss and subsequent restoration of feeder;
   d. Failure to "open" on loss of one or both non-monitored feeder phases;
   e. Failure to "open" when network voltage falls due to fault conditions; and
   f. Failure to "open" during arcing fault conditions, such as serial, parallel, and ground;
2) Corrosion of tank and subsequent loss of internal components;
3) Non-corrosion related water penetration into tank and subsequent damage of internal components;
4) Catastrophic rupture when closing into a network fault;
5) Catastrophic rupture due to failure to open during extended arcing fault;
6) Failure of mechanical charging system;
7) Failure of electronic control components; and
8) Component failure (i.e., mechanical, including pivots, guides, spring-charging drive, etc.)

Thus, it would be desirable to provide a network protector that has high reliability, requires low maintenance, and, if necessary, can be retrofitted into an existing network transformer system.

Vacuum interrupters were developed in the late 1960s for power-switching applications and have been used in various switches, circuit breakers, and other electrical power devices, including, for example, tap changers, reclosers, circuit breakers, and as loadbreak switches.

"Tap changers" are devices that are used for the momentary interruption of voltage in a power transformer between incremental changes from one tap to the next. Tap changers are typically used on the high voltage tap windings of medium voltage transformers and are not used for isolating the incoming electrical supply of the transformer.

"Reclosers" are switching devices that are used for power restoration and represent a specialized switch that is used to restore power to overhead or underground radial power lines following an outage that may be caused by line contact with tree branches, wildlife, or a lightning strike, for example. Thus, the recloser is used to isolate power to a line when there is a fault condition, and then attempt to reconnect a fixed number of times to automatically restore power. The recloser is limited to switching operations. Reclosers do not contain any transformative features.

U.S. Pat. No. 9,136,077 to Hu et al., the subject matter of which is herein incorporated by reference in its entirety, describes the use of three-phase, multi-way submersible loadbreak vacuum interrupter switchgear designed to replace oil-insulated and sulfur hexafluoride ($SF_6$) gas-insulated switchgear used in three-phase power distribution systems. The switchgear comprises a combination of electrical disconnect switches, fuses, or circuit breakers, and is used to control, protect or isolate electrical equipment for the distribution of reliable electricity within a power system. The switchgear is used to both de-energize the equipment to allow work to be conducted and to clear faults and to distribute power to different areas within the system.

Furthermore, in the event of natural disasters, such as an earthquake, electrical energy providers may need to discontinue service to various consumers of the utility's service, as described, for example, in U.S. Pat. Pub. No. 2012/0274440 to Meadows et al., the subject matter of which is herein incorporated by reference in its entirety, because continuing to provide the utility service to a damaged or burning structure can further exacerbate the risks to those in the facility as well as emergency responders. Generally, disconnecting the utility service requires that electrical power service be disconnected at the damaged facility. In other instances, the utility may shut off large sections of its distribution system if the damage is widespread. However, doing so may interrupt utility service to areas that are not affected or to areas where the electric utilities are needed to aid with rescue and repair efforts. Thus, it would also be desirable to provide an improved network protector that is also designed or configured to connect/disconnect the transformer to/from a secondary power distribution system in the event of a natural disaster.

Electrical service providers may also desire to electronically communicate with key control and measurement equipment for numerous purposes including scheduling disconnection or connection of utility services to the metered loads, load shedding and load control, automatic distribution and smart-grid applications, outage reporting, and possibly for providing additional services such as Internet, video, and audio, etc. In many of these instances, in order to perform these functions, the equipment must be configured to communicate with one or more computing devices through a communications network, which can be wired, wireless or a combination of wired and wireless, as known to one of ordinary skill in the art. Thus, it would be desirable to provide an improved network protector that is configured to communicate more efficiently with control and measurement equipment.

SUMMARY OF THE INVENTION

It is an object of the present invention to provide an improved network service and transformer system protector for a network transformer system.

It is also an object of the present invention to provide a network service and transformer system protector that uses specialized low voltage high current vacuum interrupter switching technology to provide a compact profile, elimination of arc chutes, and uses a single or three independent electromagnetic actuator(s) or electromechanical actuator mechanism.

It is another object of the present invention to provide an improved network service and transformer system protector that has high reliability.

It is still another object of the present invention to provide a network service and transformer system protector that is capable of detecting and responding to problems below the 'trip' level of the network protector protective circuit.

It is still another object of the present invention to provide an improved network service and transformer system protector that requires less maintenance.

It is still another object of the present invention to provide an improved network service and transformer system protector that allows crews to more easily troubleshoot or conduct network equipment inspections.

It is still another object of the present invention to provide a network service and transformer system protector that can be retrofitted into an existing network transformer.

It is still another object of the present invention to provide a network service and transformer system protector that could be fully enclosed within, and become an integral part of a network transformer during manufacturing.

It is still another object of the present invention to provide a network service and transformer system protector that is designed or configured to connect/disconnect a transformer from a secondary power distribution system in the event of a natural disaster.

To that end, in one embodiment, the present invention relates generally to a network service and transformer safety protector comprising:
  A) a set of three low voltage, high current vacuum interrupters;
  B) an insulated mechanical linkage that interconnects the three low voltage, high current vacuum interrupters to allow opening and closing by a single actuator;
  C) a supervisory system comprising a supervisory controller and corresponding sensors within the network service and transformer safety protector and associated transformer;
  wherein the network service and transformer safety protector is configured to:
    i) open the circuit for loss of power to the transformer or faults, either in the transformer or a primary feeder/primary switch serving the transformer,
    ii) automatically open the circuit whenever power flows form the secondary network through the transformer to the primary cable (reverse power flow), and
    iii) close the circuit whenever conditions are such that power is required to flow from the transformer to supply the secondary network.

In another embodiment, the present invention also relates generally to an improved network transformer tank system that includes the network service and transformer safety protector of the invention.

BRIEF DESCRIPTION OF THE DRAWINGS

For a fuller understanding of the invention, reference is made to the following description taken in connection with the accompanying figures, in which.

Also, while not all elements may be labeled in each figure, all elements with the same reference number indicate similar or identical parts.

DETAILED DESCRIPTION OF THE PREFERRED EMBODIMENTS

Figure 1:
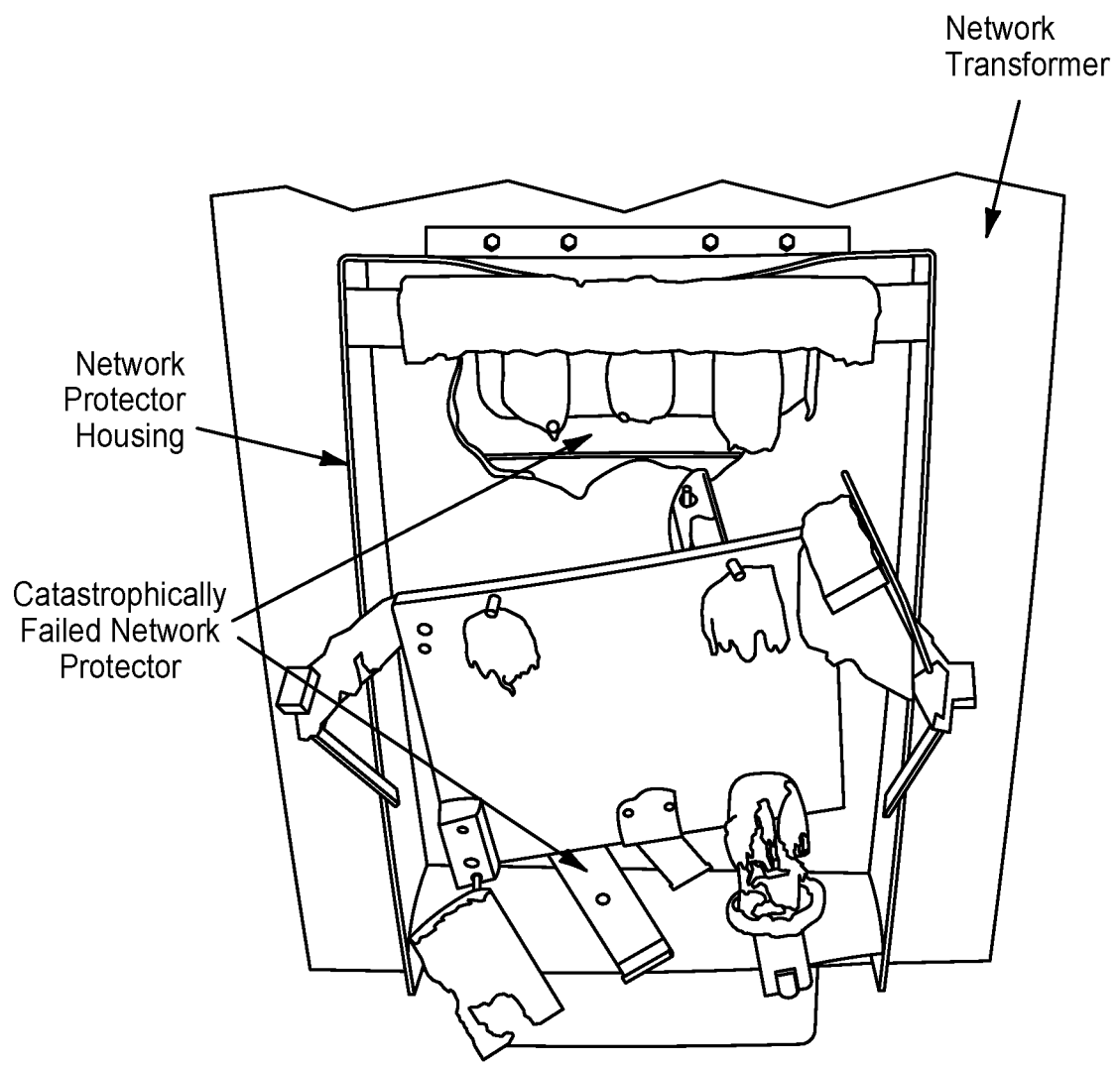
FIG. 1 depicts a photograph of a catastrophically failed network protector of the prior art.
Figure 2:
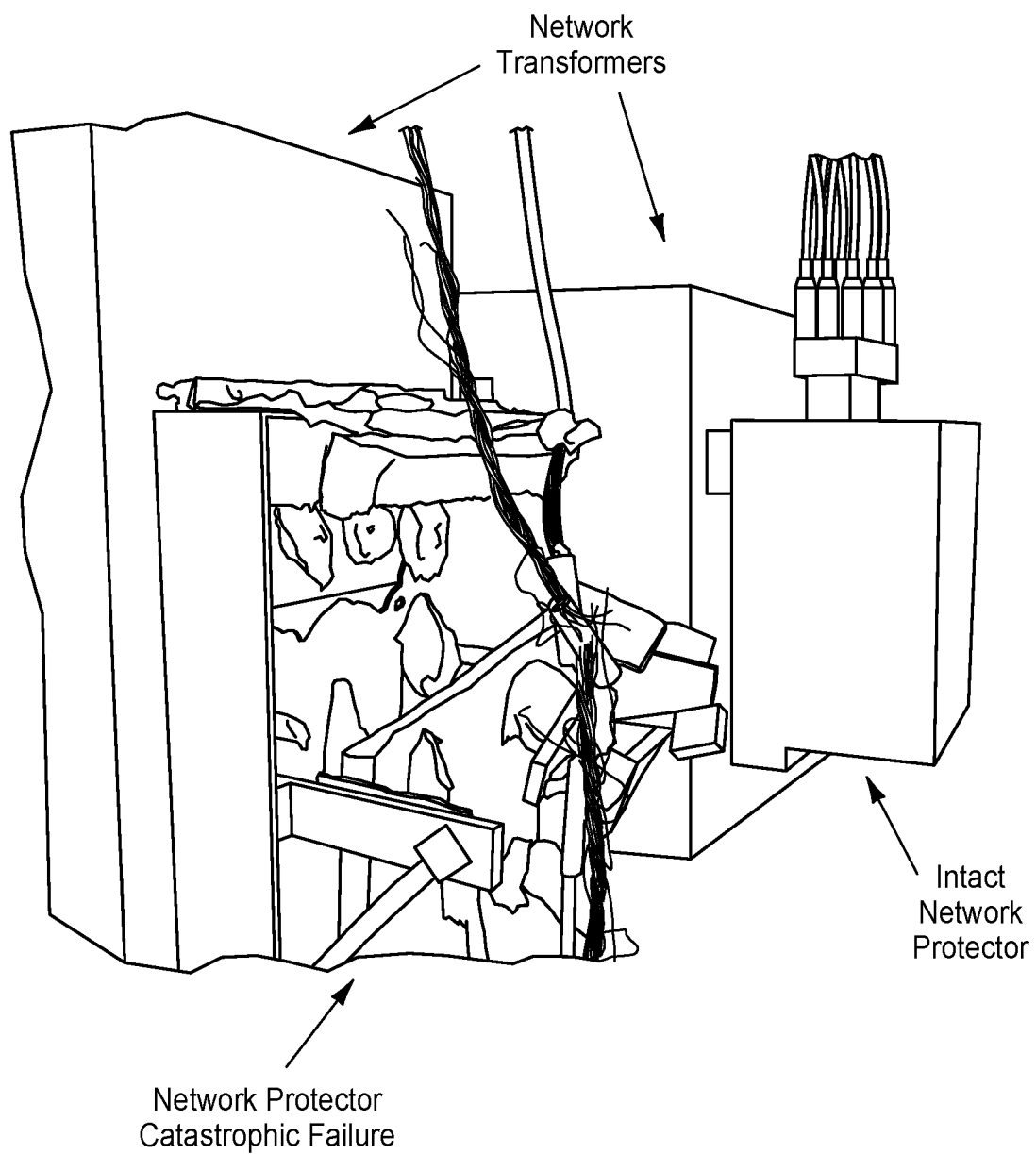
FIG. 2 depicts a photograph of another view of the network protector of FIG. 1.
Figure 3:
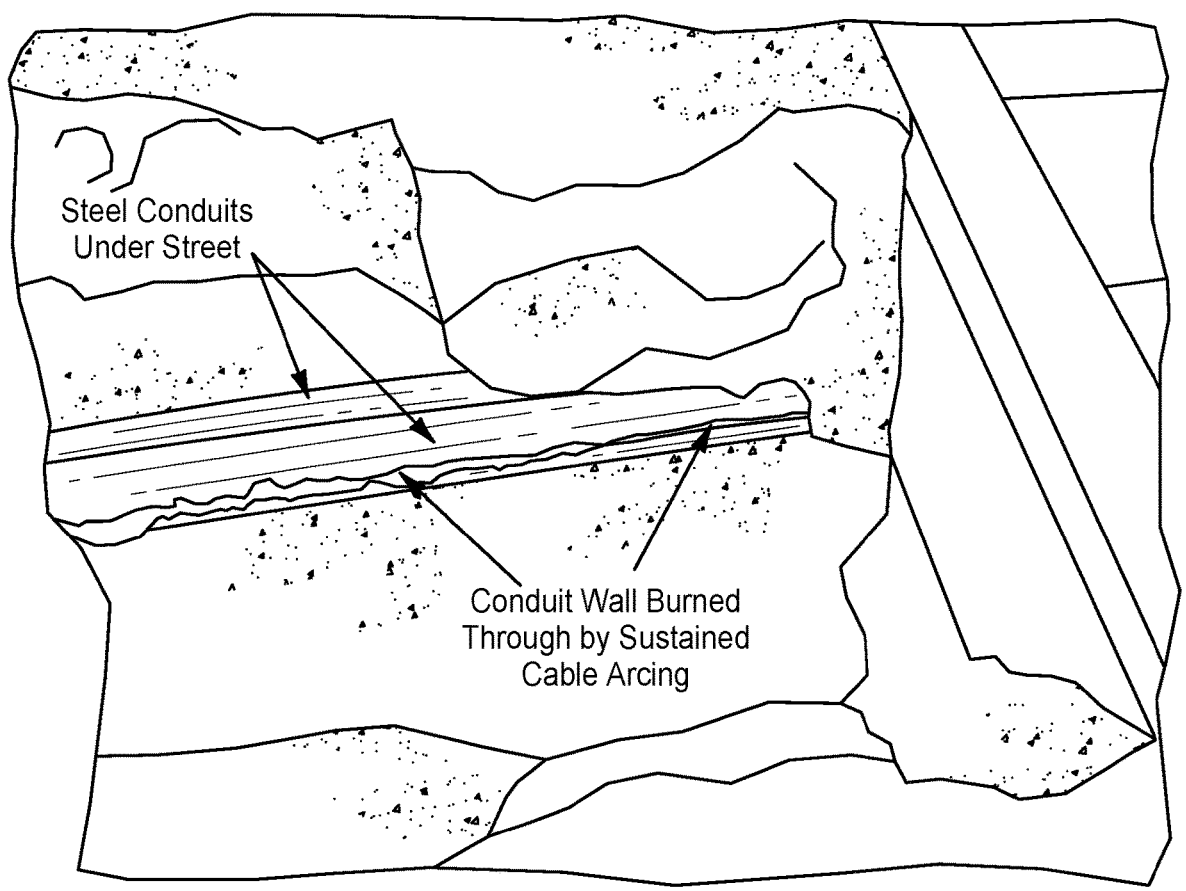
FIG. 3 depicts a photograph of steel conduits under a street and shows that the conduit wall was burned through axially by a sustained cable arcing fault event that traveled a substantive distance.
Figure 4:
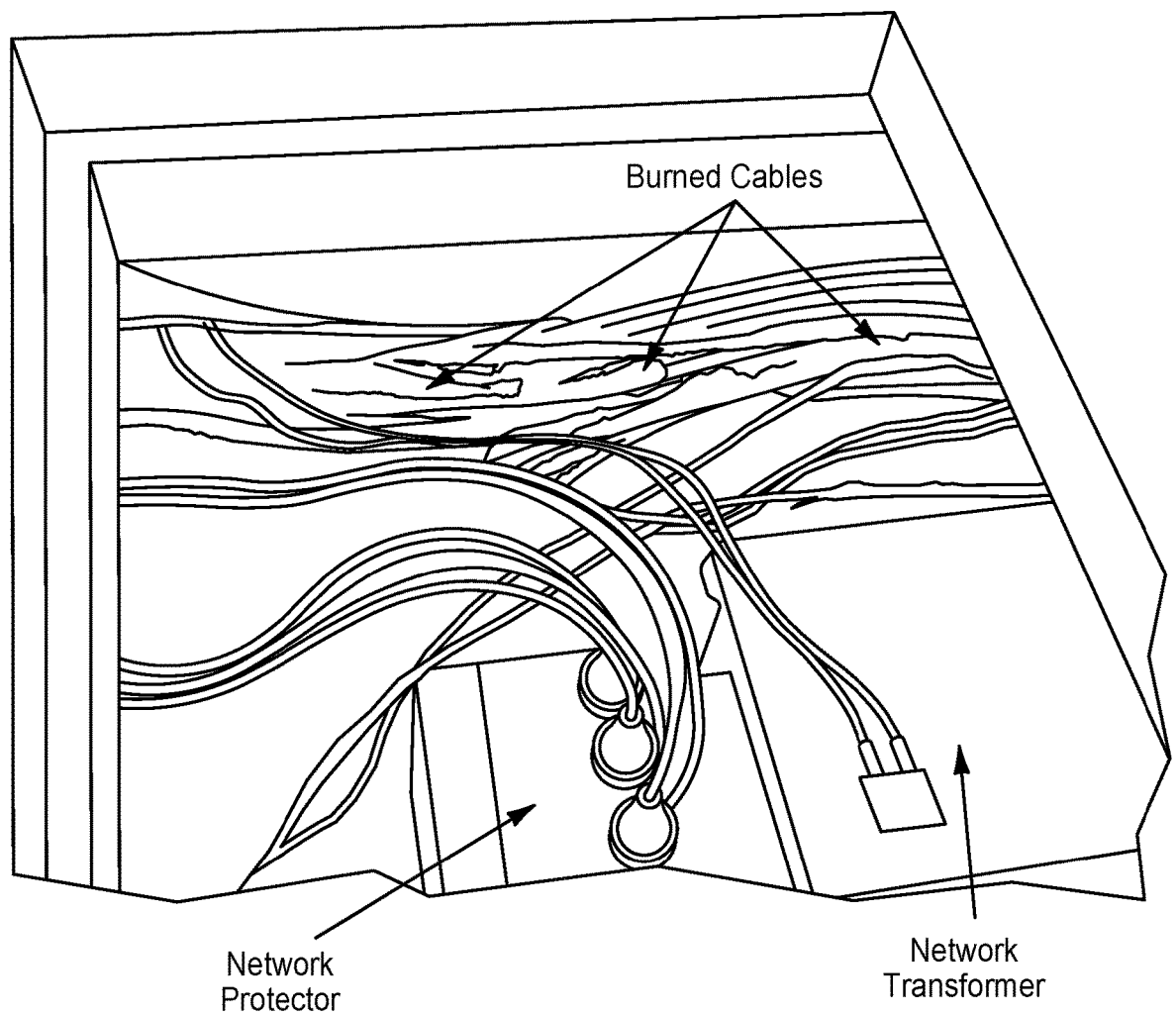
FIG. 4 depicts a photograph of another type of network event where power fed backward from a network and caused catastrophic damage.
Figure 5:
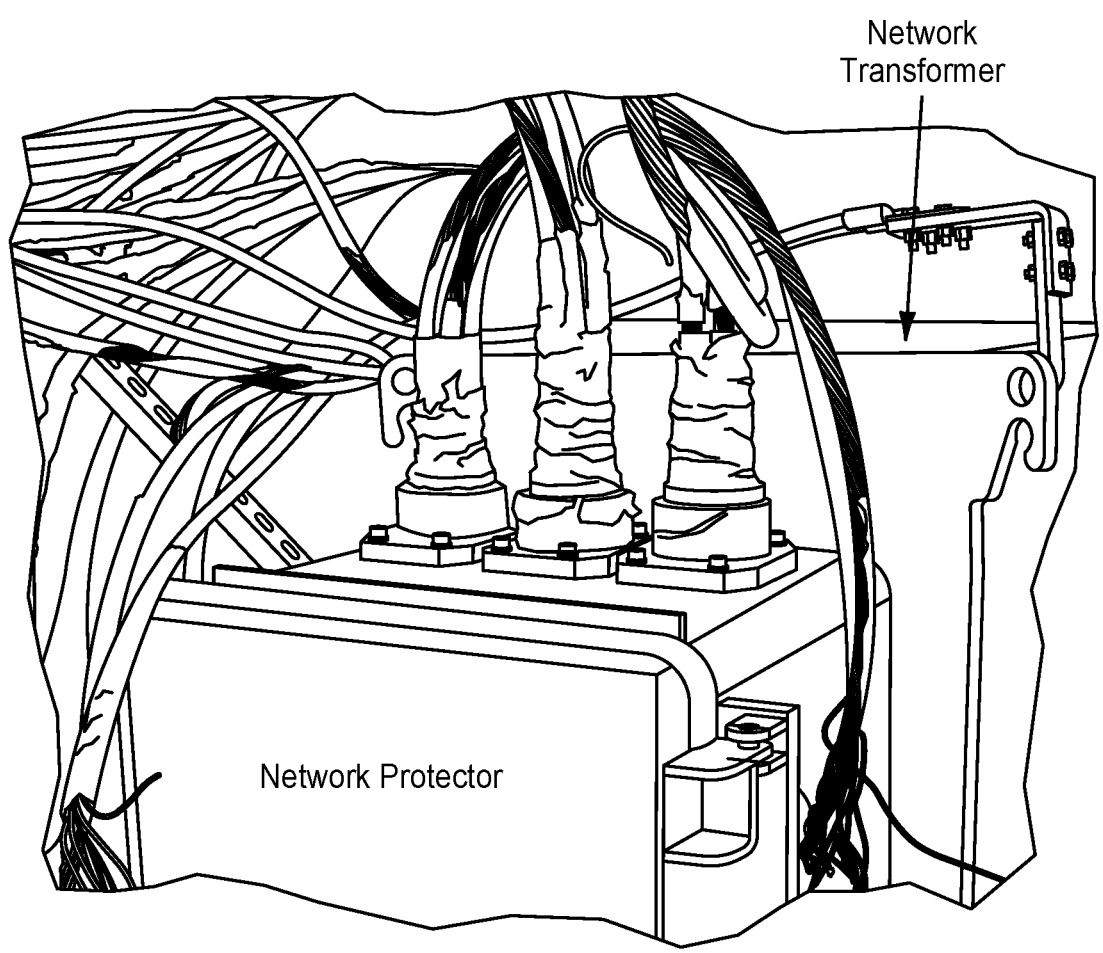
FIG. 5 depicts another view of the network transformer and network protector of FIG. 4.
Figure 6:
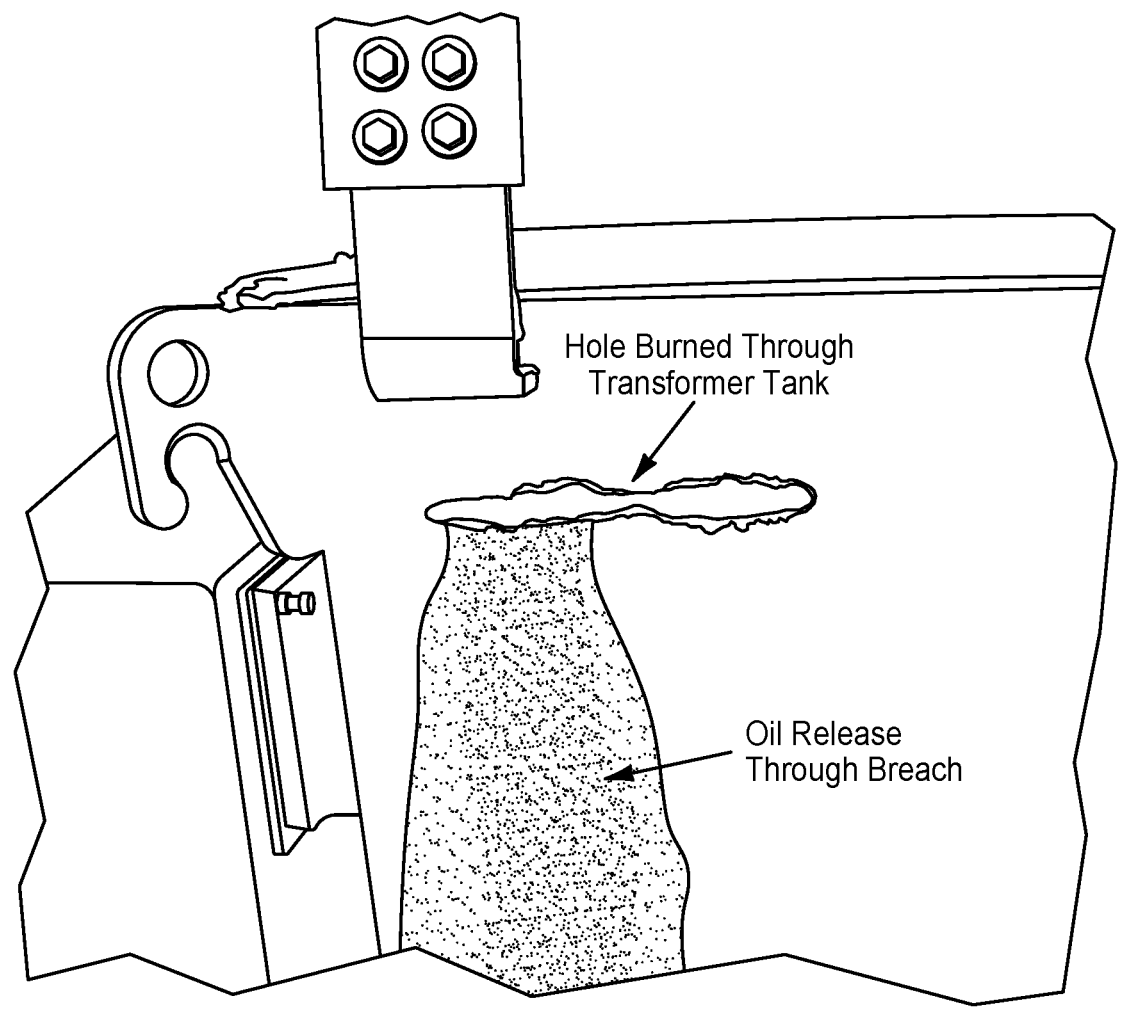
FIG. 6 depicts a photograph of a network protector and network transformer showing damage that caused one of the current paths inside the transformer to overheat and burn away, resulted in a horizontal breach through the steel tank of the transformer tank.
Figure 7:
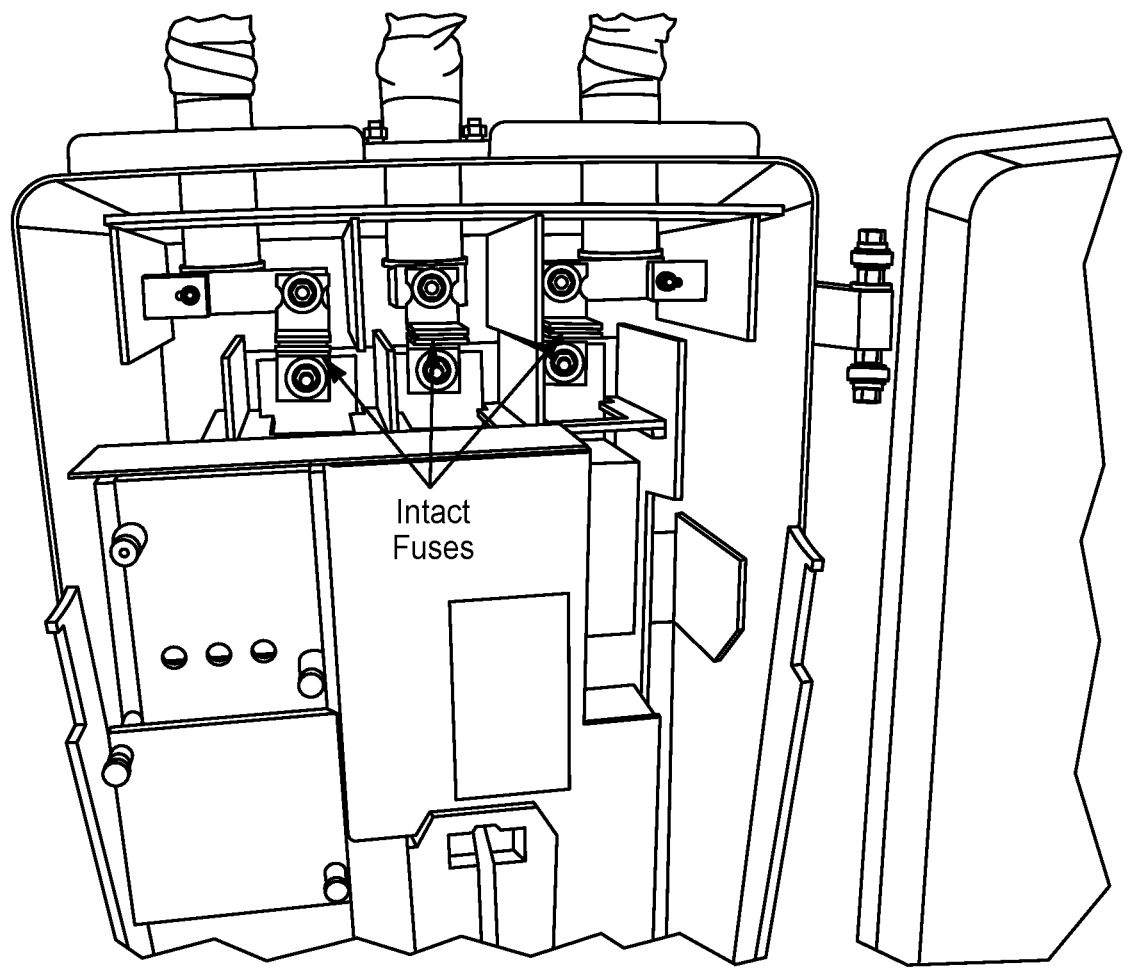
FIG. 7 depicts a photograph of intact fuses of a prior art network protector.
Figure 8:
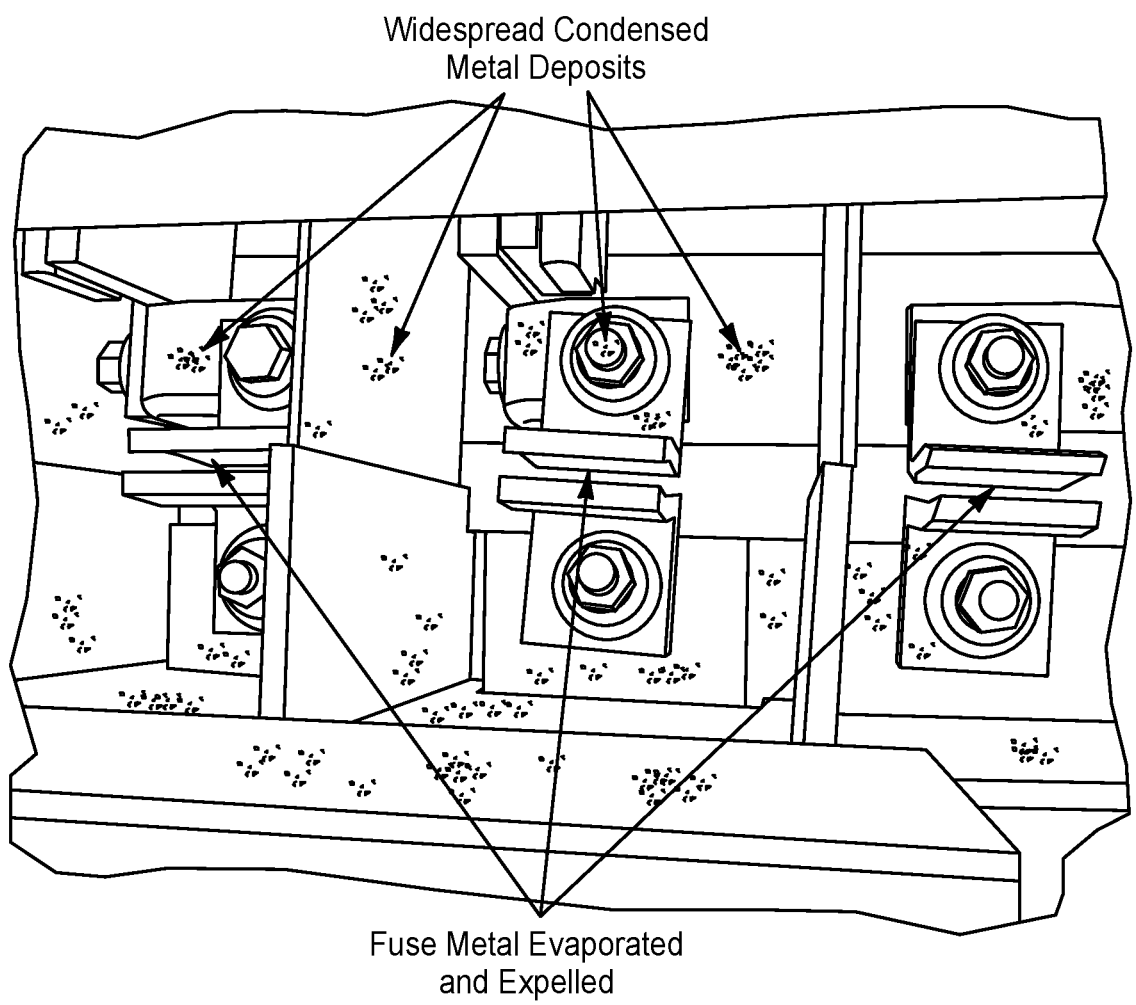
FIG. 8 depicts a photograph of fuses of a prior art network protector in which the fuses 'open' under a short circuit condition, causing the metal fuse links to evaporate within the network protector housing and metal vapor to subsequently condense and contaminate the interior.

To that end, in one embodiment, the present invention relates generally to a network service and transformer safety protector comprising:

A) a set of three low voltage, high current vacuum interrupters;

B) an insulated mechanical linkage that interconnects the three low voltage, high current vacuum interrupters to allow opening and closing by a single actuator;

C) a supervisory system comprising a supervisory controller and corresponding sensors within the network service and transformer safety protector and associated transformer;

wherein the network service and transformer safety protector is configured to:

i) open the circuit for loss of power to the transformer or faults, either in the transformer or a primary feeder/primary switch serving the transformer, ii) automatically open the circuit whenever power flows form the secondary network through the transformer to the primary cable (reverse power flow), and iii) close the circuit whenever conditions are such that power is required to flow from the transformer to supply the secondary network.

In another embodiment, the present invention also relates generally to an improved network transformer tank system that includes the novel network transformer described herein.

The network transformer tank system comprises:

a) optionally, a controllable primary switch configured to isolate a network transformer from a power grid or network, wherein the controllable primary switch connects medium voltage feeder cables to the network transformer comprising the network transformer tank system;

b) a network transformer tank system comprising a sealed transformer tank and one or more heat exchangers; and c) a network service and transformer safety protector on the secondary side of the network transformer tank system, wherein the network service and transformer safety protector is positioned between the network transformer and a secondary network distribution system, wherein the network service and transformer safety protector is configured to:

i) open the circuit for loss of power to the transformer or faults, either in the transformer or the primary feeder/primary switch serving the transformer, ii) automatically open the circuit whenever power flows form the secondary network through the transformer to the primary cable (reverse power flow), and iii) close the circuit whenever conditions are such that power is required to flow from the transformer to supply the secondary network;

wherein both the primary switch and the network service and transformer safety protector comprise vacuum interrupters, and wherein the primary switch and the network service and transformer safety protector each are capable of isolating the transformer from a network.

In order to provide a clear and consistent understanding of the invention described herein, reference is also made to the following definitions:

What is meant by "cable limiter" is an enclosed fuse for disconnecting a faulted cable from a secondary network distribution system and protecting the non-faulted portion of that cable from serious thermal damage. Cable limiters are external to a network protector. While cable limiters are commonly used, they often fail to provide adequate protection because they are passive and cannot react to transient over-current conditions or sustained arcing at a level below the protective limit of the device. Thus, cable limiters are not always a viable back-up.

By "grid network" what is meant is a secondary network system with geographically separated network units and the network-side terminals of the network protectors interconnected by low-voltage cables that span the distance between sites.

By "network master relay" what is meant is an electromechanical poly-phase relay that functions to (1) open the network protector when power flow is from the low-voltage side to the high-voltage side of the network transformer; and (2) close the network protector in conjunction with the electromechanical network-phasing relay when transformer voltage is higher than network voltage and leads the network in phase angle.

By "network protector fuse" what is meant is a backup protective device for the network protector.

By "network protector", also referred to herein as "NWP", what is meant is an assembly comprised of a circuit breaker and its complete control equipment for: (1) opening the network protector when power flow is from the low-voltage side to the high-voltage side of the network transformer and (2) closing the network protector in conjunction with the electromechanical network-phasing relay when transformer voltage is higher than network voltage and leads the network in phase angle. The network protector is arranged to automatically connect its associated transformer to the secondary network distribution system when conditions are such that the transformer, when connected, will supply power to the secondary network distribution system and to automatically disconnect the transformer from the network when power flows from the secondary network distribution system to the transformer.

By "network system" what is meant is a collection of spot networks, secondary grid networks, or combinations thereof along with the primary feeders that supply them.

By "network transformer" what is meant is a transformer designed for use within a vault of various types to feed a variable capacity system of interconnected low voltage secondary circuits. A network transformer may be submersible or installed in a dry vault.

By "primary network feeder" what is meant is a three phase medium voltage cable that supplies power to the network transformer from a substation or other intermediate medium voltage distribution control center.

By "pumping" what is meant is the rapid, uncontrolled, unintentional, and intolerable repetitive tripping and closing cycle of a network protector, which may be due to a failure in the network protector control circuitry. If pumping is not quickly detected and corrected, it can lead to failure of the network protector or network transformer.

By "secondary network" what is meant is the low-voltage circuits supplied by the network units (the network transformer and its associated network protector).

By "secondary network distribution" or "network" what is meant is an AC power distribution system in which customers are served from three-phase, three wire or four-wire low-voltage circuits supplied by one (radial configuration) or more (ring configuration) network transformers whose low-voltage terminals are connected to the low-voltage circuits through network protectors. The secondary network system has two or more medium-voltage primary feeders, with each primary feeder supplying between 1-5 network transformers, depending on network size and design. The system includes automatic protective devices intended to isolate faulted primary feeders, network transformers, or low-voltage cable sections while maintaining service to the customers served from the low-voltage circuits.

By "spot network" what is meant is a secondary network distribution system that consists of two or more network units at a single site. The secondary network-side terminals of these network units are connected together with bus or cable.

By "low voltage" what is meant is equipment that is rated for service below 2,000 volts (2 kV).

By "medium voltage" what is meant is equipment that is rated for service from 2,000 volts (2 kV) to about 46,000 volts (46 kV).

By "high voltage" what is meant is equipment that is rated for service from about 46,000 volts (46 kV) to about 230,000 volts (230 kV).

By "extra high voltage" (EHV) what is meant is equipment that is rated for service about 230,000 volts (230 kV) and above.

As described herein, the present invention relates generally to a network service and transformer safety protector that may be coupled to and/or attached directly to a transformer tank. In one preferred embodiment, the network service and transformer safety protector is bolted to the outside of the transformer tank, such as by attaching the network service and transformer safety protector to a flange on the outside of the transformer tank.

In another embodiment, the present invention relates generally to a network protector that can be retrofitted to an existing transformer tank system.

In another embodiment, the network service and transformer safety protector is housed within the transformer tank itself, and is mounted in a first compartment of the tank of the transformer tank system. In this embodiment, the network service and transformer safety protector is mounted in the transformer tank system by welding during the manufacturing process. In this embodiment, the network service and safety protector is submerged in the same mineral oil as used to house the components of the transformer tank in a separate compartment.

In another embodiment, the network service and transformer safety protector is coupled to the transformer tank but is positioned on a wall of the vault or other housing of the transformer tank system. Furthermore, it is contemplated that the network protector may be positioned outside of the vault or other housing of the transformer tank system.

As described herein, the network service and transformer safety protector of the invention is semi-intelligent, meaning that operations are controlled through a programmable microprocessor-based system that integrates inputs from many high speed sensors and compares and cross-compares the inputs against various algorithms that can be selected or adjusted by the user, through an external computer interface. In one embodiment, the network service and transformer safety protector of the invention receives medium voltage in from substation at 23 kV, and discharges low voltage out to customer at 120/208 or 277/480 via the network protector.

In the present invention, the conventional air-insulated circuit breakers are replaced with a vacuum interrupter and the traditional arc-breaking technology is eliminated from the design. Thus, the improved network service and transformer safety protector of the instant invention generally comprises:

A) Specialized low voltage, high current vacuum interrupters;

B) A rigid, insulated mechanical linkage that interconnects all three vacuum interrupters to allow opening and closing by a single actuator;

C) Optionally, but preferably, the actuator uses purely electromagnetic or electromechanical means to open and close the vacuum interrupters;

D) A supervisory smart controller and corresponding sensors within the protector and network transformer;

E) A supervisory system that eliminates all electromechanical relays and uses, instead, purely electronic switching to provide consistent, maintenance-free, and hysteresis-free operation;

F) Optionally, but preferably, a means to visually confirm the 'open' or 'closed' position of the vacuum interrupters; and G) Optionally, but preferably, a mechanical means, connected to an external handle, to secure the protector into an 'open' position to ensure worker safety during maintenance and repair activities.

The specialized low voltage high current vacuum interrupters used in the network service and transformer safety protector of the instant invention are configured for low voltage, which may be 120/208 or 277/480 and high current, which may be up to 10,000 amps, more preferably up to 20,000 amps.

On the other hand, the vacuum interrupters used in the primary switch are configured for high voltage and low current. In particular, the voltage may be up to 15,000 volts and the current is less than or equal to 600 amps.

Figure 9:
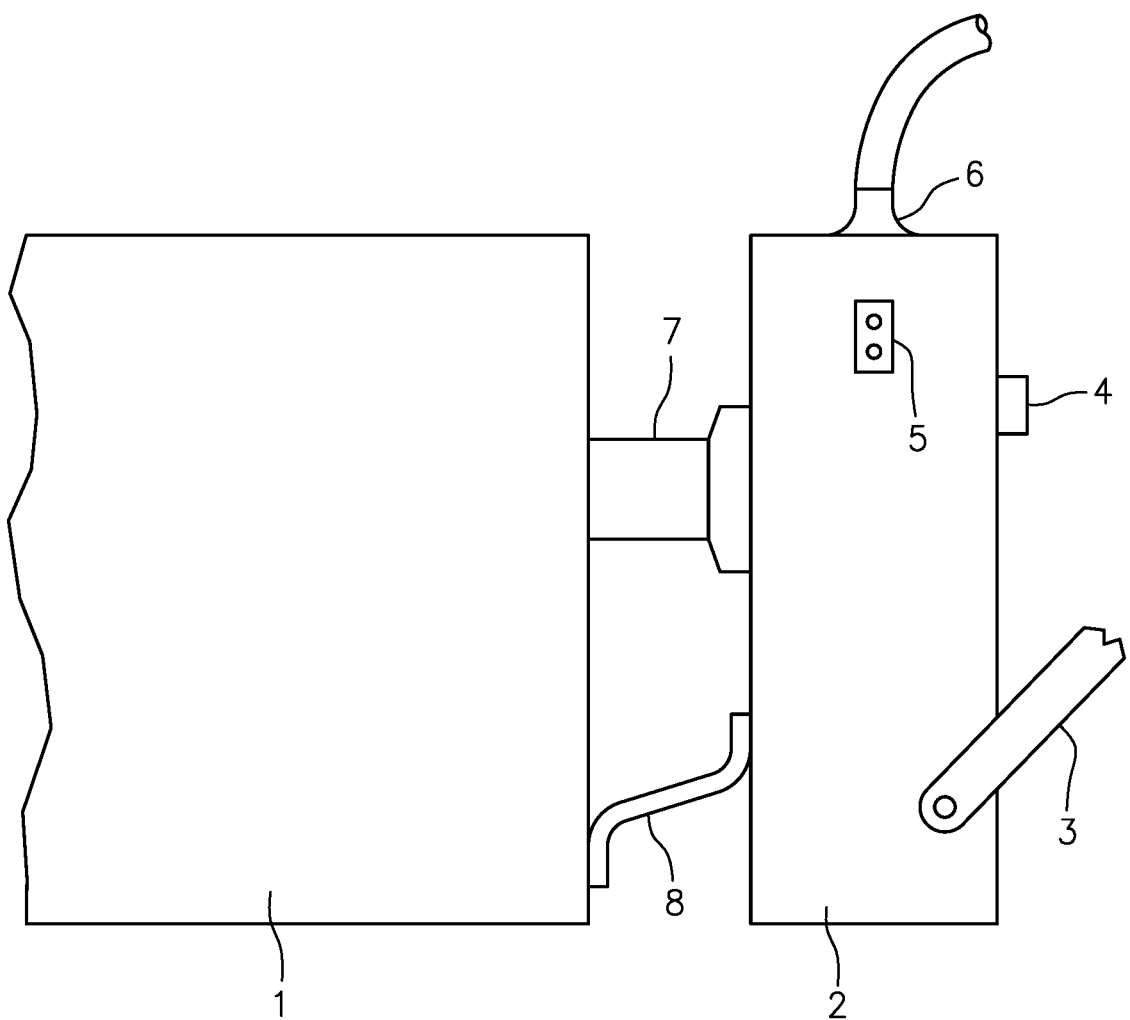
FIG. 9 depicts a side view of the network service and transformer safety protector of the present invention along with an associated transformer tank.

FIG. 9 depicts a side view of the network service and transformer safety protector of the present invention interconnected with a network transformer. As depicted in FIG. 9, network transformer 1 is connected to network service and transformer safety protector 2 by throat 7. Throat 7 houses a plurality of low voltage bushings (most typically 3) (not shown) that convey low voltage power from the network transformer 1 to the network service and transformer safety protector 2. The throat 7 includes a bolted flange that connects directly to the network service and transformer safety protector 2.

A lockable safety handle 3 is provided to prevent the network service and transformer safety protector 2 from inadvertently closing while maintained in the open position for systems repair, testing, and maintenance. Viewport 4 allows for inspect of the vacuum interrupters (not shown) contained in the housing of the network service and transformer safety protector 2. In one embodiment, viewport 4 may comprise a separate viewport for each vacuum interrupter with one over an indicator flag on the vacuum interrupters as shown in FIG. 9. A keypad 5, which may be a two button keypad is provided to allow for manual open/close operation.

The network service and transformer safety protector 2 also includes a plurality of output terminals that in one embodiment, may take the form of an external enclosed fuse.

Finally a plurality of braces 8 may be positioned at the each lower corner of the cabinet of the network service and transformer safety protector 2 adjacent to the transformer tank 1 to provide support between the base of the network service and transformer safety protector 2 and the transformer tank 1.

Figure 10:
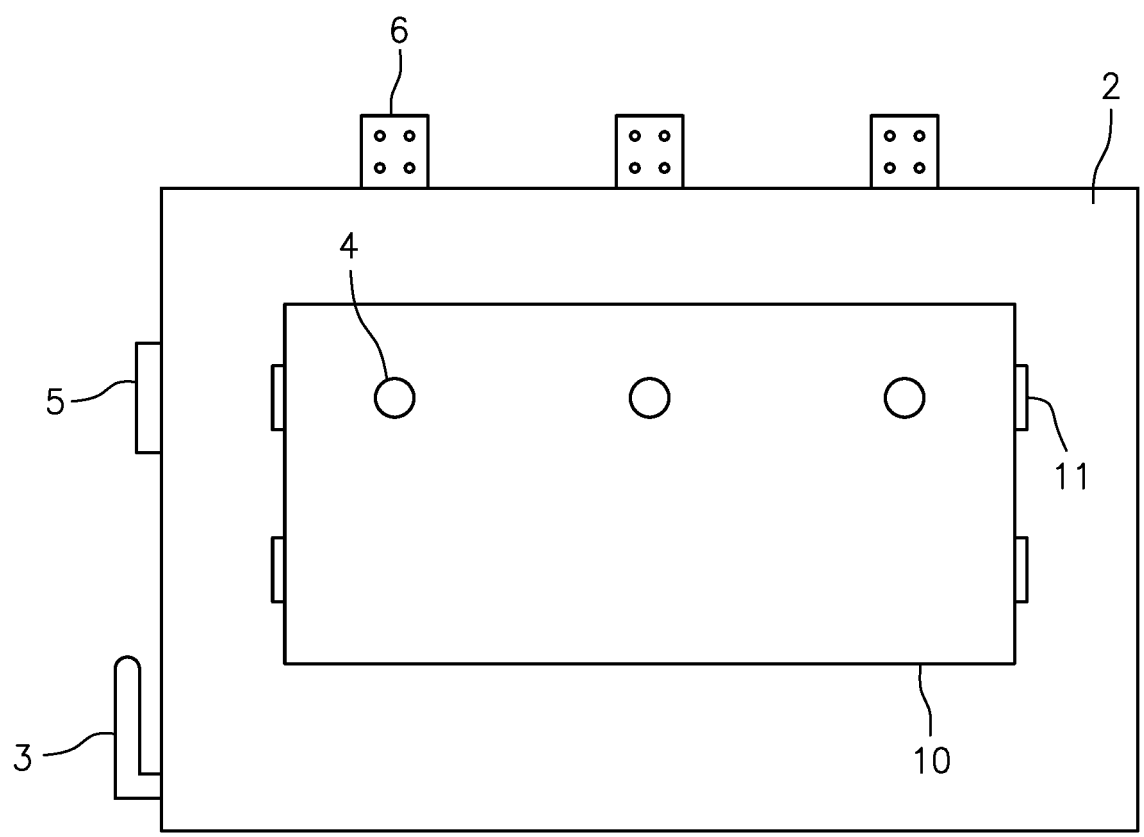
FIG. 10 depicts an end view of the network service and transformer safety protector of the present invention.

FIG. 10 is an end view of the face of the network service and transformer safety protector 2 that shows a door panel 10 with hinges 11 that are configurable for left-hand or right-hand swing to allow for best fit in the enclosure or vault that houses the transformer tank system.

One of the major benefits of using vacuum interrupters as the circuit breakers in the network protector is that there are no moving parts that need to be repaired or replaced. In addition, the electronics can be located externally (i.e., outside of the tank) in an accessible enclosure. Depending on the space, an accessible enclosure can be mounted on a top of the transformer tank or may be mounted on a wall of the network vault in electric communication with the transformer.

As discussed above, many of the network protectors of the prior art utilize air-insulated air-break circuit breakers which can fail due to open or close due to malfunction of electro-mechanical relays, failure to respond to high frequency arcing fault conditions, mechanical failures and others. In addition, these circuit breakers may not trip if the problem is below the 'trip' level of the network protector protective circuit. These existing network protectors also contain both stationary contact and moving contacts that contribute to high failure rates, require maintenance, are spring loaded, motor closed, require a motor and associated components, and require a mechanical "puffer" mechanism that projects air through the arc to break the arc.

In contrast, the network protector of the instant invention uses vacuum interrupters that do not have moving parts and can be configured to detect and/or mitigate problems in the network transformer system before such problems become catastrophic. Thus, the network protector described herein has greatly reduced failure rates, requires only minimal maintenance, and is much simpler to operate.

In addition, the control system of the network protector of the instant invention is also improved. Many prior art network protectors use electromagnet relays that sense $V_{in}$, correct phase between the transformer tank system and the secondary network, and that contains a current limiting relay that is capable of distinguishing "in" or "out" and disconnecting the network protector if network demand too high (i.e., short circuit), and preventing current from coming back in if too high. However, problems with these electromagnetic relays include mechanical hysteresis, slow operation relative to electronic switches, contact fouling and corrosion. In contrast, the control system of the present invention replaces the electromagnetic relay with solid state relays and switches that preferably also includes a microprocessor. The benefits to using a solid state relay include instantaneous response, zero maintenance, stability that eliminates periodic testing, near-infinite service life. In one embodiment, solid state relays include switching of the actuator solenoid power.

In addition, the controller for the instant invention incudes additional sensors and microprocessor logic to detect and analyze arcing fault conditions, based on broad detection and characterization of high frequency signatures of parallel, series, ground, and phase-to-phase arcing faults.

In addition, the sensor and logic system for the instant invention includes digital sensors and signal processing circuitry to detect conditions where one feeder is not energized, where internal heating develops, where a reverse power flow condition develops, where the network voltage declines and calls for additional power from the network transformer and protector, and other functions, in addition to determine where to power the controller and solenoid from the transformer, network, or battery.

The control and supervisory system of the instant invention also includes interface communication with utility communications system based on fiber optics, radio frequency (RF), or carrier line communications.

The control and supervisory system of the instant invention will communicate with sensors that detect the primary voltage and current in the primary feeder cables, through sensors installed by the network transformer manufacturer or by another means. These sensors can also be configured to detect and interrupt an incipient fault within the transformer.

In one embodiment, the control and supervisory system of the instant invention accepts input from other sensors, including those for network transformer oil temperature and/or oil pressure, wherein sensing a rapid rate of rise might be useful in identifying and interrupting an incipient adverse event. In one embodiment, the network protector described herein is configured for and has built in remote operability. This remote operability allows a user to be at a remote locate and communicate and control the network protector from the remote location. Security protocols may also be built in to limit access to only authorized users.

During operation, the control and supervisory system communicates with sensors to detect one or more of the following. In a preferred embodiment, the control and supervisory system communicates with the sensors to detect all of the following:

Operational—
- Primary voltage, all phases
- Primary current, all phases
- Network voltage, all phases
- Network current magnitude and direction
- Network phase angle (when open)
- Ground fault detection
- Arc fault detection directed at high frequency signals that are characteristic of such events and include parallel racing faults, series arcing faults, and ground arcing faults
- Secondary voltage (on transformers only different when network switch in open position
- Cabinet pressure detector
- Cabinet humidity or water detector
- Operations counter
- Vault ambient temperature The network service and transformer safety protector design of the present invention comprises a set of three vacuum interrupters that are coupled to an insulated mechanical linkage that interconnects the three low voltage, high current vacuum interrupters to allow opening and closing by a single actuator or three independent actuators.

The vacuum interrupter portion of the network service and transformer safety protector of the invention comprises a casing of an insulating material, such as ceramic or a suitable glass, and a pair of metallic end caps that close the ends of casing, which are disposed within a cylindrical bore of the housing. The casing forms an airtight vacuum chamber. The first and second end caps are sealed to the casing to render the enclosed chamber vacuum-tight. The vacuum interrupter switch of the preferred embodiment is a low voltage, high current vacuum-type current interrupter.

Figure 11:
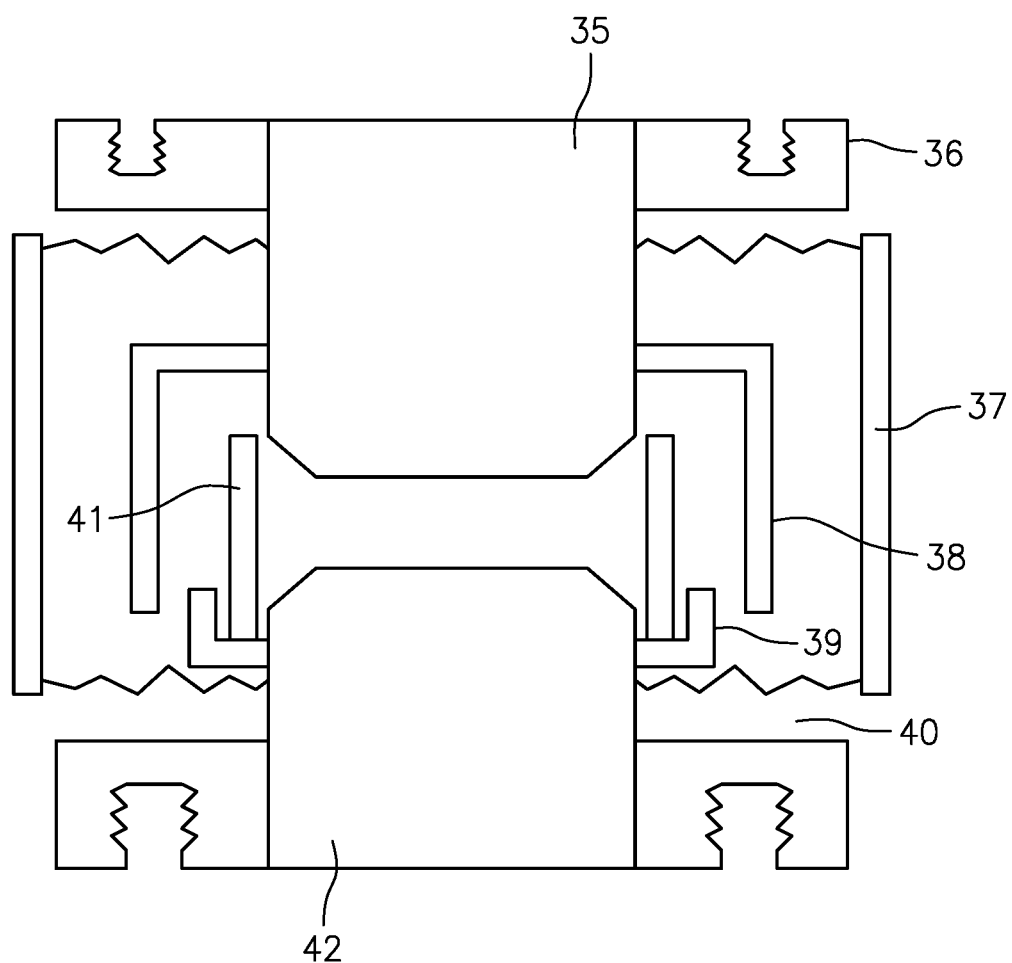
FIG. 11 depicts a cross-section of a vacuum interrupter of the present invention.

FIG. 11 depicts a cross section of a vacuum interrupter in accordance with the present invention. As shown in FIG. 11 the vacuum interrupter of the present invention comprises a pair of contact comprising an upper contact 35 and a lower contact 42. The contacts may have faces formed from tungsten-containing copper, pure copper, chromium-modified copper, or another suitable material. In one embodiment, upper and lower contacts 35 and 42 may be solid copper-chromium contacts. The vacuum interrupter also includes a base plate with mounting holes, which in one embodiment may be a copper nickel base plate. The vacuum interrupter also includes an external insulating ceramic housing 37 and a plasma shroud extending from the upper contact 35. A second plasma shroud 39 extends from the lower contact 42. The second plasma shroud 39 also supports a porous ceramic plasma shroud 41 for condensing metal vapor produced during high current interruption. A stainless steel bellow 40 at the top and bottom allow for vacuum boundary preservation while allowing contacts to articulate up and down.

Figure 12:
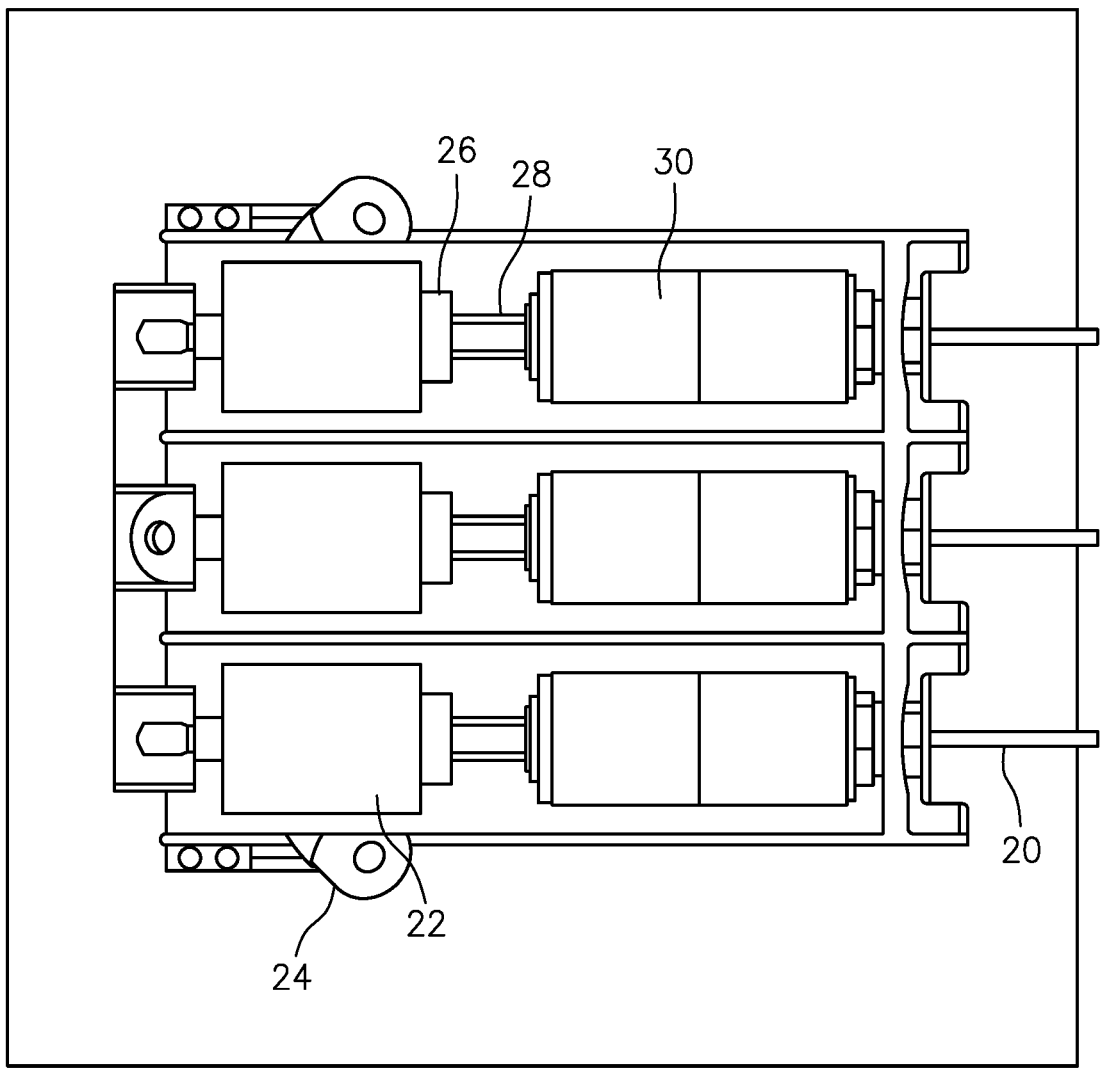
FIG. 12 depicts a view of the inside of the network service and transformer safety protector cabinet of the instant invention and showing three parallel vacuum interrupters with their corresponding electromagnetic operators.

FIG. 12 shows a view of the inside of the network service and transformer safety protector cabinet, showing three parallel vacuum interrupters with their corresponding electromagnetic operators.

Electrical connection 20 connects the upper terminal 18 of the vacuum interrupter to the cable terminal to which the network cables connect. The three parallel vacuum interrupters are each connected to one of the three parallel electromagnetic actuator coils 22 that includes a bi-stable permanent magnet and armature configured to hold the actuator in the 'open' or 'closed' position following energizing the coil to accomplish an opening or closing stroke. The use of a bi-stable magnet eliminates the need for continuous power application to hold the actuator in either position. The lower electrode 28 of the vacuum interrupter is the movable electrode of the vacuum interrupter. The ferromagnetic core 26 operates with the electromagnetic actuator coil 22 to move the vacuum interrupter rod to the 'open' or 'closed' position. A flexible electrical link 24 connects between the lower rod of the vacuum interrupter and the bus coming from the network transformer 1.

In contrast, the tradition design of the prior art utilizes a mechanical, open air switch. This prior art switch uses mechanical linkage and a stored mechanical energy system (spring) to force the contacts open or closed in a rapid manner to ensure rapid 'clearing' and 'closing operations, with minimal corresponding arcing. The mechanical linkage is based on an over-center type of linkage which in some instances may be used in a primary switch as described in U.S. Pat. Pub. No. 2018/0301279 to Klaponski et al., the subject matter of which is herein incorporated by reference in its entirety.

Moreover, the number of components required for network protector devices of the prior art is large. The contact set includes one stationary portion and one moving portion. The moving contact is articulated on a pivoted shaft. The contact faces are subject to erosion and oxidation due to the presence of air. To quench the arc that forms when the contacts open under load (defined as a load-break operation), arcing that continues across the gap as the contacts open must be forcibly interrupted. This includes forced, rapid opening of the contacts, an air blast system that 'blows' the arc away from the gap between the contacts, and an arc chute into which the arc is blown. The arc chute is comprised of a hollow channel, lined on both sides with a ceramic material having a convoluted profile. The arc chutes become contaminated with condensed metal vapor that is produced when the contacts are exposed to arcing conditions during operation. Eventually, the arc chutes are subject to surface electrical flashover due to the electrical conductivity of the condensed metal film. The arc chutes require periodic electrical testing and, where indicated, these must be cleaned or replaced.

In contrast, the present invention uses a set of three vacuum interrupters to eliminate virtually all of this complexity and associated maintenance.

The prior art design of the loadbreak switch invariably exposes the interior of the network protector to an open arc. Any combustible gases within the protector could be caused to ignite or combust explosively. In a situation where internal polymeric components are being caused to overheat, decomposition products include combustible organic compounds. Application of vacuum interrupters eliminates all chances of an exposed arc.

The end caps are preferably stainless steel and are affixed to the cylindrical casing using suitable means, such as by brazing with a high temperature alloy. In this instance, the alloy is melted at the interface of the parts (like a solder) to form a vacuum-tight, hermetic seal. First and second switch contacts are disposed within the chamber of the casing.

The present invention replaces a conventional open air circuit breaker of a network protector with one or more vacuum interrupters in the improved network service and transformer safety protector of the instant invention.

The vacuum interrupters are fully self-contained within a vacuum housing in the transformer tank and thus any arcing resulting from the opening and closing of the vacuum interrupters within the controllable network service and transformer safety protector can be fully isolated within the sealed vacuum housing.

By operation of the vacuum interrupters, power is conveyed from the incoming supply to the transformer when the pair of electrical contacts is in mutual contact, and no power is conveyed to the load from the incoming power supply when the pair of electrical contacts are separated from one another.

The actuator means reciprocates the vacuum interrupter connecting rods and thus moves the movable contact away from the stationary contact, creating a circuit-interrupting or arcing gap between the contacts. The resulting arc, although quickly extinguished, vaporizes some of the metal on the contacts. In order to prevent this metallic vapor from condensing on the internal insulating surfaces within the chamber, a generally cylindrical, central metallic shield can be mounted within the chamber and extending along an interior axial length of tubular casing, as described, for example, in U.S. Pat. No. 5,597,992 to Walker, the subject matter of which is herein incorporated by reference in its entirety.

The controllable network protector described herein may also comprise various security features to prevent inadvertent activation of the network service and transformer safety protector.

In another embodiment, the network service and transformer safety protector includes design features that enable the network service and transformer safety protector to be compatible with 'smart grid' electronic technology and for the network protector to be remotely activated and operated. Sensors may be interfaced through a fiber optic network using protocols developed by various control manufactures. One such control system manufacturer is Schweitzer Engineering Laboratories (SEL).

By integrating the network service and transformer safety protector and transformer, and optionally, but preferably, a primary switch, a fully integrated product can be designed, from the outset. This fully integrated design can be used in combination with a fault-tolerant transformer design, as described, for example in U.S. Pat. No. 10,217,556 to Groeger et al., the subject matter of which is herein incorporated by reference in its entirety. This fully integrated design is also compatible with standard vault and network system designs.

The controllable network protector may be manually-actuated or remotely-actuated. In one embodiment the network protector is configured to allow for remote switching capability, which enables the network protector to be fully smart grid compliant.

The transformer tank system described herein may also comprise one or more sensors to monitor conditions in the transformer tank system. Various visible and audible alarms and control actions may be operatively connected to the one or more sensors to provide feedback if operating conditions exceed prescribed parameters. These one or more sensors may monitor, for example, temperature, ground current, seismic/vibration magnitude, oil level, oil pressure, and oil temperature, among others. In one embodiment, the seismic/vibration sensor may include, for example, an accelerometer, such as a microelectromechanical systems (MEMS) accelerometer, or a seismometer. In one aspect, if seismic activity is determined to exceed a threshold level, then the utility service can be disconnected.

Various security features may also be included in the transformer tank system to provide remote access and/or to prevent unauthorized intrusion.

The network protector described herein can be used with a variety of transformer types, including network transformers and pad-mounted transformers, using insulating fluid or with dry type insulation systems. In a preferred embodiment, the network protector is used with a network transformer, insulated with oil or other suitable fluid.

Finally, it should also be understood that the following claims are intended to cover all of the generic and specific features of the invention described herein and all statements of the scope of the invention that as a matter of language might fall there between.

What is claimed is:

1. A network service and transformer safety protector comprising:
   A) a set of three low voltage vacuum interrupters;
   B) an insulated mechanical linkage that interconnects the three low voltage vacuum interrupters to allow opening and closing by a single actuator or three independent actuators;
   C) a supervisory system comprising a supervisory controller and corresponding sensors within the network service and transformer safety protector and associated transformer;
   wherein the network service and transformer safety protector is configured to:
      i) open the circuit for loss of power to the transformer or faults, either in the transformer or a primary feeder/primary switch serving the transformer,
      ii) automatically open the circuit whenever power flows from the secondary network through the transformer to the primary cable, and
      iii) close the circuit whenever conditions are such that power is required to flow from the transformer to supply the secondary network;
   wherein the vacuum interrupters are each connected to an electromagnetic actuator coil;
   wherein the electromagnetic actuator coil comprises a bi-stable permanent magnet and an armature configured to hold the actuator in an 'open' or 'closed' position when the electromagnetic actuator coil is energized.

2. The network service and transformer safety protector according to claim 1, wherein the network service and transformer safety protector automatically disconnects its associated transformer from the secondary network when power flows from the secondary network through the network service and transformer safety protector and into the transformer.

3. The network service and transformer safety protector according to claim 1, wherein the network service and transformer safety protector automatically connects its associated transformer to the secondary network to supply power to the secondary network.

4. The network service and transformer safety protector according to claim 1, wherein the network service and transformer safety protector is directly attached to the associated transformer.

5. The network service and transformer safety protector according to claim 1, wherein the network service and transformer safety protector is housed within a contiguous tank of the associated transformer.

6. The network service and transformer safety protector according to claim 1, wherein the network service and transformer safety protector is positioned adjacent to the associated transformer.

7. The network service and transformer safety protector according to claim 1, wherein operations of the network service and transformer safety protector ate controlled by a programmable microprocessor.

8. The network service and transformer safety protector according to claim 1, wherein the low voltage vacuum interrupters comprise a three-phase configuration of first contacts and second contacts facing the first contacts, wherein the first contacts and second contacts have faces formed from copper or a copper alloy.

9. The network service and transformer safety protector according to claim 8, wherein power is conveyed from the transformer to the secondary network when the first and second contacts of the low voltage vacuum interrupters are in mutual contact.

10. The network service and transformer safety protector according to claim 1, wherein no power is conveyed to the transformer from the second network when the first and second contacts of the low voltage vacuum interrupters are separated from each other.

11. The network service and transformer safety protector according to claim 1, wherein the network service and transformer safety protector is configured for remote activation and operation.

12. A network transformer tank system comprising:
A) a controllable primary switch configured to isolate a network transformer from a power grid or network, wherein the controllable primary switch connects medium voltage feeder cables to the network transformer comprising the network transformer tank system;
B) a network transformer tank system comprising a sealed transformer tank and one or more heat exchangers; and
C) a network service and transformer safety protector on the secondary side of the network transformer tank system, wherein the network service and transformer safety protector is positioned between the network transformer and a secondary network distribution system, wherein the network service and transformer safety protector is configured to:
  i) open the circuit for loss of power to the transformer or faults, either in the transformer or the primary feeder/primary switch serving the transformer,
  ii) automatically open the circuit whenever power flows from the secondary network through the transformer to the primary cable and
  iii) close the circuit whenever conditions are such that power is required to flow from the transformer to supply the secondary network;
wherein both the primary switch and the network service and transformer safety protector comprise vacuum interrupters, and
wherein the primary switch and the network service and transformer safety protector each are capable of isolating the transformer from a network;
wherein the vacuum interrupters are each connected to an electromagnetic actuator coil;
wherein the electromagnetic actuator coil comprises a bi-stable permanent magnet and an armature configured to hold the actuator in an 'open' or 'closed' position when the electromagnetic actuator coil is energized.

* * * * *

UNITED STATES PATENT AND TRADEMARK OFFICE
CERTIFICATE OF CORRECTION

| | | |
|---|---|---|
| PATENT NO. | : 11,424,611 B2 | Page 1 of 1 |
| APPLICATION NO. | : 16/841003 | |
| DATED | : August 23, 2022 | |
| INVENTOR(S) | : Joseph H. Groeger et al. | |

It is certified that error appears in the above-identified patent and that said Letters Patent is hereby corrected as shown below:

In the Specification

Column 1, Line 11:
Insert:
--STATEMENT OF FEDERALLY SPONSORED RESEARCH--

Column 1, Line 14:
Insert:
--This invention was made with government support under DE-SC0019873 awarded by the U.S. Department of Energy. The government has certain rights in the invention.--

Signed and Sealed this
Seventeenth Day of October, 2023

Katherine Kelly Vidal
*Director of the United States Patent and Trademark Office*